United States Patent
Du Breuil et al.

(10) Patent No.: US 10,659,828 B2
(45) Date of Patent: May 19, 2020

(54) ELASTIC SWITCHED DIGITAL VIDEO (SDV) TRAFFIC CONTROL WITH ADAPTIVE BIT RATE STREAMING

(71) Applicant: ARRIS Enterprises LLC, Suwanee, GA (US)

(72) Inventors: Thomas L. Du Breuil, Ivyland, PA (US); Robert S. Heiman, Warrington, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/211,401

(22) Filed: Dec. 6, 2018

(65) Prior Publication Data

US 2019/0191197 A1 Jun. 20, 2019

Related U.S. Application Data

(60) Provisional application No. 62/598,663, filed on Dec. 14, 2017.

(51) Int. Cl.
| | |
|---|---|
| H04N 21/238 | (2011.01) |
| H04N 21/845 | (2011.01) |
| H04L 29/06 | (2006.01) |
| H04N 21/24 | (2011.01) |
| H04N 21/2381 | (2011.01) |
| H04N 21/85 | (2011.01) |

(52) U.S. Cl.
CPC ... *H04N 21/23805* (2013.01); *H04L 65/4084* (2013.01); *H04L 65/80* (2013.01); *H04N 21/2402* (2013.01); *H04N 21/8456* (2013.01); *H04N 21/2381* (2013.01); *H04N 21/85* (2013.01)

(58) Field of Classification Search
None
See application file for complete search history.

(56) References Cited

U.S. PATENT DOCUMENTS

| | | |
|---|---|---|
| 7,668,195 B2 | 2/2010 | Stone |
| 2008/0244667 A1 | 10/2008 | Osborne |
| 2010/0086020 A1 | 4/2010 | Schlack |
| 2013/0132986 A1 | 5/2013 | Mack |
| 2018/0184143 A1 | 6/2018 | Davis |
| 2019/0020700 A1* | 1/2019 | Derudder ............ H04L 65/4076 |

* cited by examiner

Primary Examiner — James R Marandi
(74) Attorney, Agent, or Firm — Thomas A. Ward

(57) ABSTRACT

A system for delivering content is provided that uses switched digital video (SDV), adaptive bit rate (ABR) streaming techniques and an ABR to Legacy Transport Stream (ALTS) converter for converting the ABR streams to a QAM-based transport stream, all under control of the SDV session manager. In operation, the SDV system can be used to select an ABR profile for a service that is destined for a QAM set top terminal based on the currently available bandwidth. Moreover, the ABR profile may be changed upward (i.e., a profile requiring a greater bandwidth) or downward (i.e., a profile requiring less bandwidth) on a dynamic basis as the number of requested services changes.

20 Claims, 5 Drawing Sheets

ELASTIC SWITCHED DIGITAL VIDEO (SDV) TRAFFIC CONTROL WITH ADAPTIVE BIT RATE STREAMING

CROSS REFERENCE TO RELATED APPLICATIONS

This Application claims priority under 35 U.S.C. § 119(e) from earlier filed U.S. Provisional Application Ser. No. 62/598,663, filed Dec. 14, 2017, the entirety of which is incorporated herein by reference.

BACKGROUND

Switched Digital Video (SDV) systems operate today with rate capped video content in order to efficiently utilize the quadrature amplitude modulation (QAM)-based distribution systems economically. A typical approach might use a rate cap of 3.75 Mbps for MPEG-2 standard definition (SD) and 15 Mbps for MPEG-2 high definition (HD). These rates support up to 10 SD channels or 2 HD plus 2 SD in a single 6 MHz 256 QAM (38.8 Mbps) pipe.

Adaptive bit rate (ABR) content, in contrast, typically has multiple profiles covering a wide range of bit rates in order to accommodate network bandwidth variations without stalling/rebuffering in order to deliver a smooth viewer experience, albeit potentially with a quality level shift arising from bit rate changes. In any case, transitions from one profile to another are seamless.

Service providers today have existing QAM-based distribution systems and most have now overlaid ABR systems to satisfy their subscriber's demands for IP-based over-the-top (OTT) services such as on-demand streaming content. As a result service providers have to maintain two distinct content distribution networks. Service providers have expressed interest in turning off their legacy distribution network and instead, using only their ABR network to service their subscribers who receive services on OTT devices as well as their subscribers who receive content on set top boxes over the QAM-based distribution systems. However, service providers are also facing significant bandwidth issues as their need to deliver data over cable networks are increasing rapidly, while they still need to deliver significant QAM video to the millions of customers with QAM set tops.

SUMMARY

In accordance with one aspect of the present disclosure, a method is presented for transmitting media content over an access network. In accordance with the method, a session setup request is received over an access network that employs a specified modulation technique from an on-demand manager for receiving on-demand media content at a specified bit rate. A profile is selected from an adaptive bit rate (ABR) main manifest for ABR media content corresponding to the SDV channel. An ABR profile manifest is requested and received from an ABR system for the selected profile of the ABR media content. The ABR media content in the profile manifest is requested from the ABR system. An ABR stream is received for the ABR media content. The ABR stream is transformed into a prescribed transport stream. The prescribed transport stream is caused to be modulated in accordance with the prescribed modulation technique. The modulated prescribed transport stream is caused to be transmitted to a client terminal over the access network.

In accordance with another aspect of the present disclosure, a method is presented for allocating bandwidth on an access network. In accordance with the method, bandwidth is monitored on an access network that employs a prescribed modulation technique. Bandwidth is assigned on the access network to an SDV channel for delivery to a client terminal over the access network based at least in part on the monitored bandwidth. A first version of an ABR content stream for media content corresponding to content requested on the SDV channel is caused to be transformed into a prescribed transport stream for delivery to the client device over the access network. The first version of the ABR content stream has a bit rate corresponding to the assigned bandwidth and is selected from among a plurality of versions available in an ABR main manifest. The bandwidth assigned to the SDV channel is adjusted while the SDV channel is being delivered to the client terminal. Responsive to the adjusting, a second version of the ABR content stream is caused to be transformed into a transport stream for delivery to the client terminal over the access network instead of the first version. The second version of the ABR content stream has a bit rate corresponding to the adjusted assigned bandwidth and is selected from among the plurality of versions available in the ABR main manifest.

DETAILED DESCRIPTION

Described herein are techniques enabling more efficient management of the bandwidth available on legacy access networks such as quadrature amplitude modulation (QAM) based networks (e.g., hybrid-fiber cable networks) using attributes of both on-demand systems (e.g., switched digital video (SDV) systems and or video-on demand systems) and adaptive bit rate (ABR) systems. As a result, service providers can expand their video service capacity over the legacy networks at peak hours and increase the quality of service seen by subscribers using their set top boxes (STBs).

Figure 1:
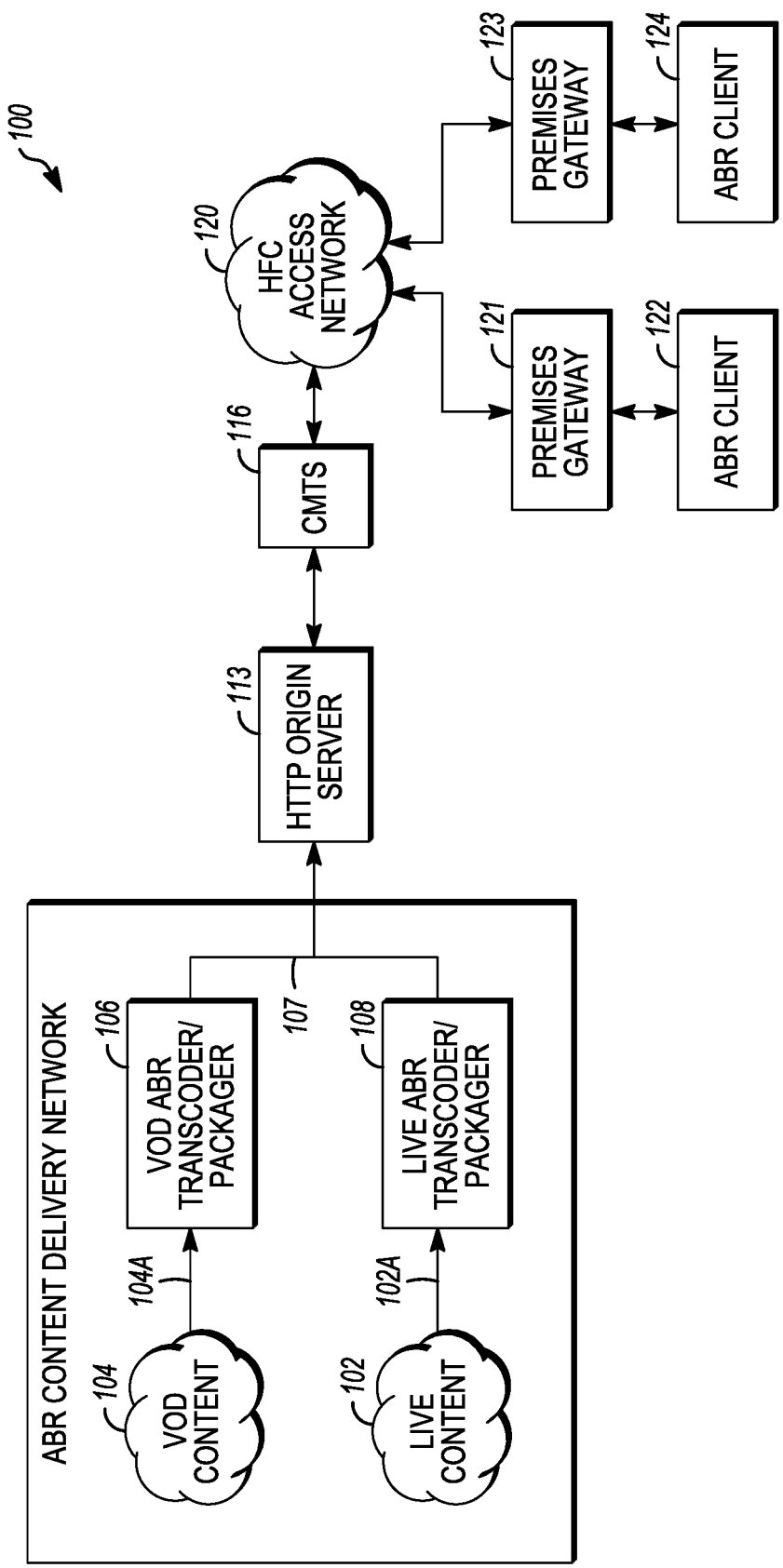
FIG. 1 depicts a high level functional block diagram of a representative adaptive bit rate system that delivers content to adaptive bit rate client devices via an internet protocol content delivery network.

FIG. 1 depicts a high level functional block diagram of a representative adaptive bit rate system 100 that delivers content to adaptive bit rate client devices 122 and 124 via an access network 120 such as a hybrid fiber-coax (HFC) network. An adaptive bit rate client device is a client device capable of providing streaming playback by requesting an appropriate series of segments from an adaptive bit rate system 100. The content provided to the adaptive bit rate system 100 may originate from a content source such as live content source 102 or video on demand (VOD) content source 104.

An adaptive bit rate system, such as the adaptive bit rate system 100 shown in FIG. 1, uses adaptive streaming to deliver content to its subscribers. Adaptive streaming, also known as ABR streaming, is a delivery method for streaming video using an Internet Protocol (IP). As used herein, streaming media includes media received by and presented to an end-user while being delivered by a streaming provider using adaptive bit rate streaming methods. Streaming media refers to the delivery method of the medium, e.g., http, rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using adaptive bit rate methods are included in the references to "media" and "streaming."

Adaptive bit rate streaming is a technique for streaming multimedia where the source content is encoded at multiple bit rates. It is based on a series of short progressive content files applicable to the delivery of both live and on demand content. Adaptive bit rate streaming works by breaking the overall media stream into a sequence of small file downloads, each download loading one short segment, or chunk, of an overall potentially unbounded content stream.

As used herein, a chunk is a small file containing a short video segment (typically 2 to 10 seconds but can be as short as a single frame in some implementations) along with associated audio and other data. Sometimes, the associated audio and other data are in their own small files, separate from the video files and requested and processed by the client(s) where they are reassembled into a rendition of the original content. Adaptive streaming may use, for instance, the Hypertext Transfer Protocol (HTTP) as the transport protocol for these video chunks. For example, 'chunks' or ' chunk files' may be short sections of media retrieved in an HTTP request by an adaptive bit rate client. In some cases these chunks may be standalone files, or may be sections (i.e. byte ranges) of one much larger file. For simplicity the term ' chunk' is used to refer to both of these cases (many small files or fewer large files).

The example adaptive bit rate system 100 depicted in FIG. 1 includes live content source 102, VOD content source 104, HTTP origin server 113 and cable modem termination system (CMTS) 116. The components between the live content source 102, VOD content source 104 and the access 120 in the adaptive bit rate system 100 (e.g., ABR transcoder/packagers 106 and 108, HTTP origin server 113 and CMTS 116) may be located in a any suitable location or locations. To the extent that they are not co-located, they may communicate over one or more networks such as an IP content delivery network (CDN) (not shown).

The adaptive bit rate system 100 receives content from a content source, represented by the live content source 102 and VOD content source 104. The live content source 102 and VOD content source 104 represents any number of possible cable or content provider networks and manners for distributing content (e.g., satellite, fiber, the Internet, etc.). The illustrative content sources 102 and 104 are non-limiting examples of content sources for adaptive bit rate streaming, which may include any number of multiple service operators (MSOs), such as cable and broadband service providers who provide both cable and Internet services to subscribers, and operate content delivery networks in which Internet Protocol (IP) is used for delivery of television programming (i.e., IPTV) over a digital packet-switched network.

Examples of an access network 120 include networks comprising, for example, managed origin and edge servers or edge cache/streaming servers. The content delivery servers, such as edge cache/streaming server, deliver content and manifest files to ABR clients 122 or 124 via a customer premises gateway such as customer premises gateway 121 and 123. In an illustrative example, access network 120 may include communication links connecting origin servers to the access network, and communication links connecting distribution nodes and/or content delivery servers to the access network. Each distribution node and/or content delivery server can be connected to one or more adaptive bit rate client devices; e.g., for exchanging data with and delivering content downstream to the connected IP client devices. The access network and communication links can include, for example, a transmission medium such as an optical fiber, a coaxial cable, or other suitable transmission media or wireless telecommunications. As previously noted, in an exemplary embodiment, access network 120 comprises a hybrid fiber-coax (HFC) network. Customer premises gateways 121 and 123 may incorporate any of a variety of different types of network interfaces depending on the type of access network 120 that is employed. For instance, customer premises gateways 121 and 123 may include fiber optic network interfaces, cable modems or other types of network interfaces.

The adaptive bit rate client associated with a user or a subscriber may include a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by ITU-T H.263 (MPEG-2) or ITU-T H.264/MPEG-4, Part 10, Advanced Video Coding (AVC), the High Efficiency Video Coding (HEVC) standard, and extensions of such standards, to transmit and receive digital video information more efficiently. More generally, any suitable standardized or proprietary compression techniques may be employed.

As shown in FIG. 1, the adaptive bit rate system 100 may deliver live content 102*a* to one or more ABR clients 122, 124 over an access network 120 via a path that includes an adaptive bit rate transcoder/packager 108, HTTP origin server 113 and CMTS 116. Likewise, the adaptive bit rate system 100 may deliver VOD content 104*a* to the one or more ABR clients 122, 124 over the access network 120 via a path that includes an adaptive bit rate transcoder/packager 106, HTTP origin server 113 and the CMTS 116. Generally, an adaptive bit rate transcoder/packager is responsible for preparing individual adaptive bit rate streams. A transcoder/packager is designed to encode, then fragment, or "chunk," media files and to encapsulate those files in a container expected by the particular type of adaptive bit rate client. Thus, a whole video may be segmented in to what is commonly referred to as chunks or adaptive bit rate fragments/segments. The adaptive bit rate fragments are available at different bit rates, where the fragment boundaries are aligned across the different bit rates so that clients can switch between bit rates seamlessly at fragment boundaries. The adaptive bit rate system generates or identifies the media segments of the requested media content as streaming media content.

Along with the delivery of media, the packagers 106 and 108 create and deliver manifest files to the HTTP origin server 113. The packager creates the manifest files as the packager performs the chunking operation for each type of adaptive bit rate streaming method. In adaptive bit rate protocols, the manifest files generated may include a main or variant manifest and a profile or playlist manifest. The main manifest describes the various formats (resolution, bit rate, codec, etc.) that are available for a given asset or content stream. For each format, a corresponding profile manifest may be provided. The profile manifest identifies the media file chunks/segments that are available to the client. The ABR client determines which format the client desires, as listed in the main manifest, finds the corresponding profile manifest and location, and then retrieves media segments referenced in the profile manifest.

The ABR transcoder/packagers 106 and 108 create the manifest files to be compliant with an adaptive bit rate streaming format of the associated media and also compliant with encryption of media content under various DRM schemes. Thus, the construction of manifest files varies based on the actual adaptive bit rate protocol. Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

In HLS, for example, the adaptive bit rate system 100 receives a media request from a subscriber's ABR client and generates or fetches a manifest to send to the subscriber's playback device in response to the request. A manifest can include links to media files as relative or absolute paths to a location on a local file system or as a network address, such as a URI path. In HLS, an extended m3u format is used as a non-limiting example to illustrate the principles of manifest files including non-standard variants.

The ABR transcoder/packagers 106 and 108 post the adaptive bit rate chunks associated with the generated manifest file to HTTP origin server 113. Thus, the HTTP origin server 113 receives video or multimedia content from one or more content sources via the ABR transcoders/packagers 106 and 108. The HTTP origin server 113 is communicatively linked to a location such as CMTS 116, which serves as the location from which the content can be accessed by the adaptive bit rate clients 122, 124.

Figure 2:
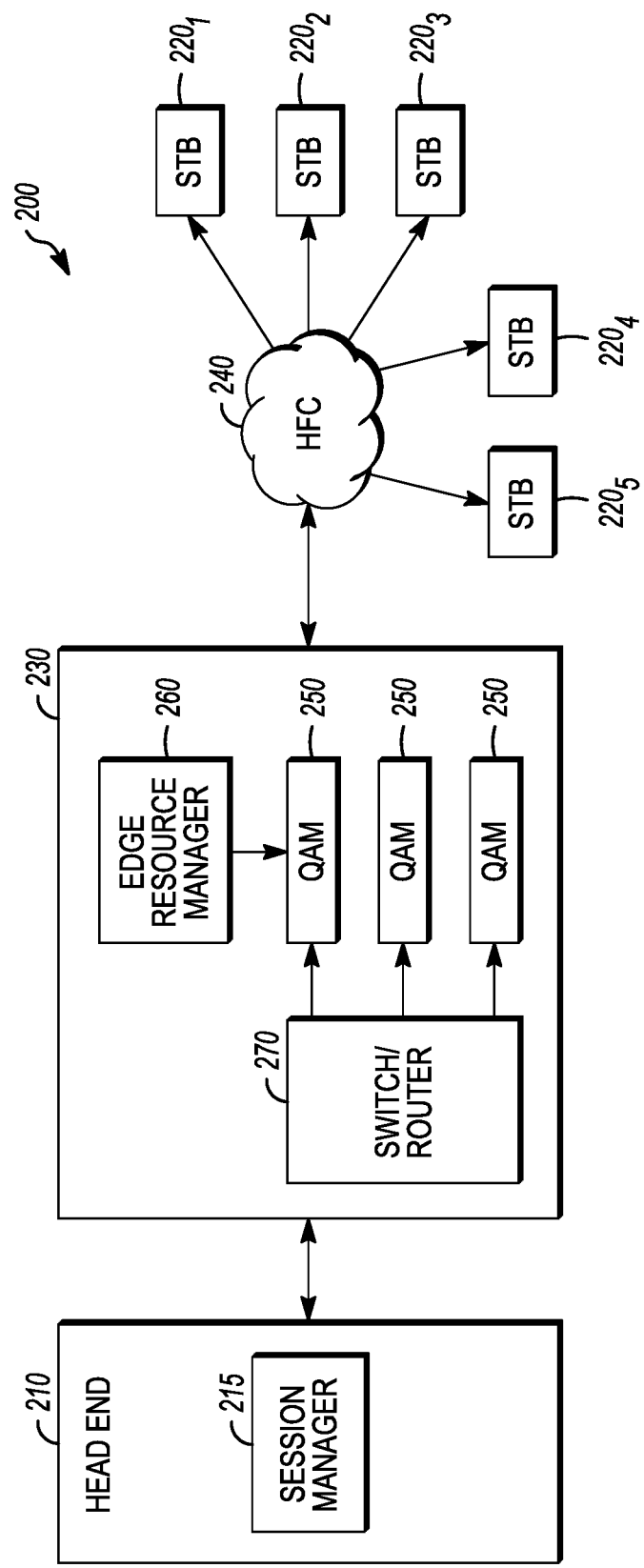
FIG. 2 depicts a high level functional block diagram of a representative switched digital video (SDV) content delivery system.

FIG. 2 depicts a high level functional block diagram of a representative SDV content delivery system 200 for delivering digital services or sessions to subscribers. In this example the digital service that is provided is switched digital video (SDV), which refers to an arrangement in which broadcast channels are only switched onto the network when they are requested by one or more subscribers, thereby allowing system operators to save bandwidth over their distribution network. Among other components, system architecture 200 comprises a content distribution source such as a headend 210 that is connected to one or more intermediate entities such as hub 230. The headend 210 communicates with a switch or router 270 in hubs 230. The headend 210 and hub may communicate over a packet-switched network such as a cable data network, passive optical network (PON) or the like using, for example, IP multicast addressing.

It should be noted that while the system illustrated in FIG. 2 as well in subsequent figures is referred to as an SDV system, more generally this system may be an on-demand system that manages and delivers any on-demand service, including not only SDV services but also VOD services. Accordingly, all references herein to SDV are equally applicable to systems that deliver any on-demand service.

The hub 230 is connected to multiple users, typically via a local cable access network 240 (e.g., a hybrid fiber-coax (HFC) network), which in turn communicates with multiple set top boxes or other subscriber terminals. In the example of FIG. 2, access network 240 communicates with set top terminals 221 and 223.

In addition to the switch or router 270, each hub includes an array of radio frequency transmitter edge devices such as edge QAM modulators 250. The number of edge devices 250 in each hub may vary as needs dictate. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

It should be noted that the precise type of edge device that is employed will vary depending on the type of access network that is employed and that this technique is applicable to any access network where the last mile bandwidth to the subscribers is a shared resource.

Hub 230 also includes an edge resource manager 260 for allocating and managing the resources of the edge devices 250. In particular, the edge resource manager 260 handles the allocation of bandwidth and the MPEG program number on each of the edge devices 250 In this way the edge resource manager 260 determines the edge device resources (e.g., bandwidth) that are needed by the on-demand session (e.g., VOD or SDV) that is to be established. The edge resource manager 260 communicates with and receives instructions from the session manager, as described below.

The session manager 215, which is illustratively shown as being located in headend 210, sets up SDV services, receive requests for such services from subscribers and communicates with the edge resource manager 260 so that the on-demand service can be switched on and off under the control of the session manager. For instance, the SDV session manager 115 is used to determine which SDV transport streams are being transmitted at any time and for directing the set top terminals to the appropriate stream. The SDV manager 215 also keeps track of which subscribers are watching which channels. In addition, all subscriber requests for a switched digital channel go through the SDV manager 215. Control information that is communicated by the set top terminals to the session managers over control channels includes subscriber requests and the like. In this way the session manager 215 is aware of the status of any of its services that are being delivered to each set top terminal at any given time. For instance, each time a set top terminal requests an SDV program such a channel change message is sent to the SDV session manager 215 by the set top terminal.

It should be noted that the distribution of components among the headend 210, the hub 230 and the access network 240 that is shown in FIG. 2 is presented by way of illustration only. In general, the distribution of these components may vary from system architecture to system architecture. For instance, some or all of the functionality of the session manager 215 may be transferred from the headend 210 to the hub 230. Likewise, some or all of the functionality of the edge resource managers 260 may be transferred from the hub to the headend or to the access network 240 or to some other location.

As previously mentioned, many service providers currently need to maintain two distribution systems: their legacy QAM-based distribution networks and overlaid ABR systems that provide streaming video and other IP-based, over-the-top services. Some service providers have expressed interest in using their ABR systems to service their clients that receive over-the-top services on an IP-based client (e.g., ABR clients 122, 124 in FIG. 1) as well as their clients that receive QAM-based services on their set top terminals (e.g., set top terminals $220_1$ and $220_2$ in FIG. 2). To accomplish this, devices are being developed to convert ABR video streams back to MPEG transport streams in order to support legacy delivery techniques such as QAM-based techniques that deliver content to legacy devices such as set top terminals. Such devices, referred to herein as an ABR to Legacy Transport Stream (ALTS) converter, may be located at the network edge in order to deliver the content over a legacy access network (e.g., an HFC network).

In accordance with the techniques described herein, the SDV session manager can be used to efficiently manage bandwidth allocation and other network resource contention issues across the various services that are delivered by only allocating bandwidth for video when it is actually needed for both on demand services such as VOD and ActiveVideo® as well as for linear (broadcast) video.

Figure 3:
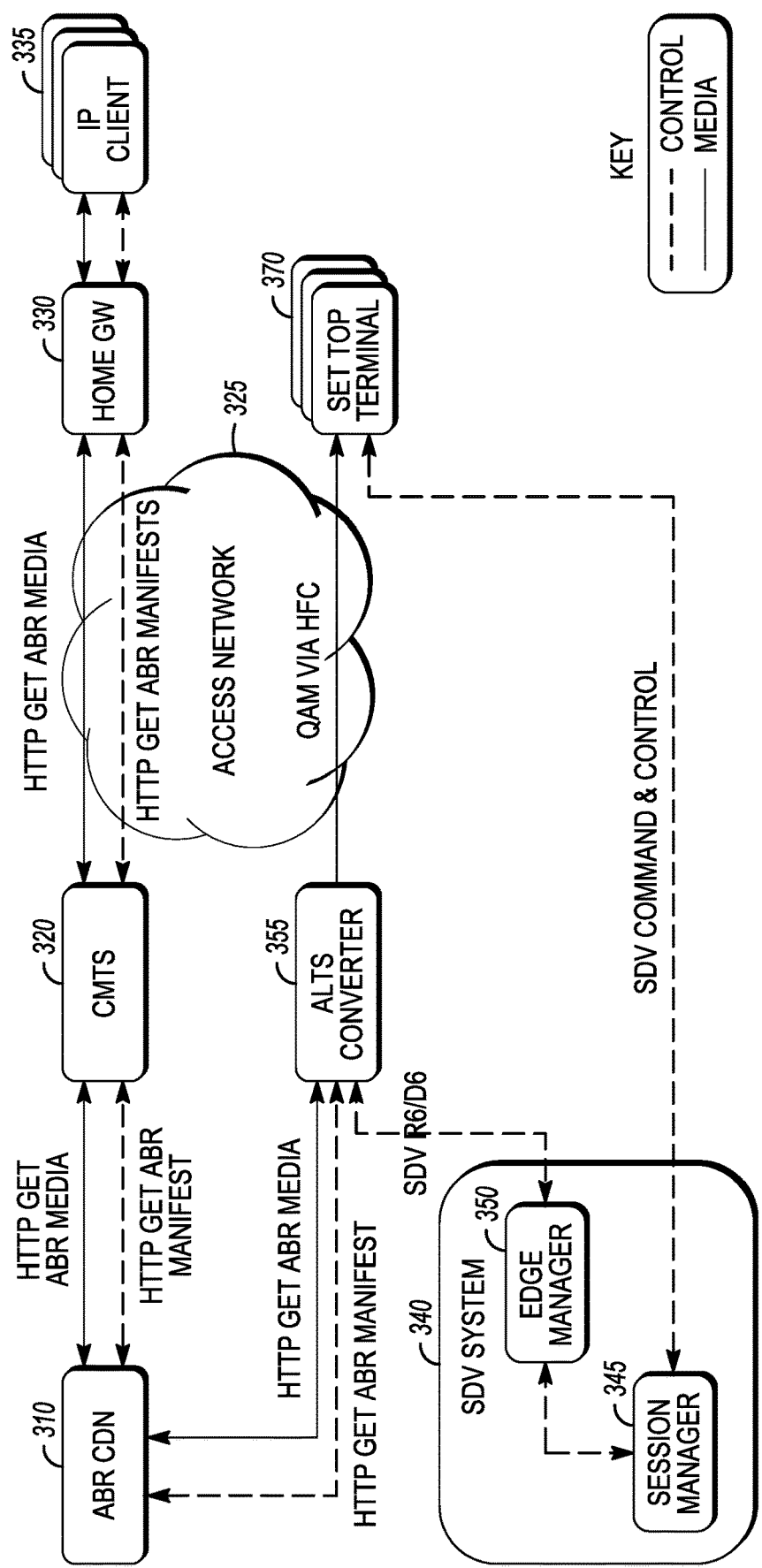
FIG. 3 depicts a high level functional block diagram of a system that delivers content using SDV, ABR streaming techniques and an ALTS converter for converting the ABR streams to a QAM-based transport stream.

FIG. 3 depicts a high level functional block diagram of a system that delivers content using SDV, ABR streaming techniques and an ALTS converter for converting the ABR streams to a QAM-based transport stream, all under control of the SDV session manager. ABR content distribution network 310 represents the various systems and networks that used provide ABR content. ABR content distribution network 310 may include things seen in FIG. 1 such as content sources, transcoders, packagers as well as origin and edge servers comprising the CDN to which the ABR content is published so that it can be made available to a cable mode transmission system (CMTS) 320 that may be located, for instance, in a regional headend. CMTS 320 communicates over access network 325 (e.g., an HFC network) with multiple customers represented by customer premises gateway 330 using IP protocols to provide ABR content to IP client 335.

FIG. 3 also shows an SDV system 340 that is represented by SDV session manager 345 and SDV edge manager 350. As previously mentioned, SDV session manager 345 and edge manager 350 may be co-located (e.g., in a headend or hub) or they may be located in different facilities. In some implementations the session manager 345 and/or the edge manager 350 may be co-located (e.g., in a headend) with CMTS 320, although this need not be the case.

Also shown in FIG. 3 is ABR to Legacy Transport Stream (ALTS) converter 355 such as an ABR to MPEG-2 transport stream converter. ALTS converter 355 converts the ABR video stream provided by ABR content distribution network 310 into a format that is suitable for transport over the legacy access network 325. For instance, in an access network that employs QAM, a QAM modulator, which may or may not be incorporated in the ALTS converter 355, receives the MPEG-2 transport stream and delivers it over the access network 325 to the set top terminal 370.

In FIG. 3 content delivery channels are illustrated by solid lines and control channels are illustrated by dashed lines. With the exception of the delivery and control paths between the ALTS converter 355 and the set top terminal 370, the remaining paths all employ IP protocols. The delivery and control paths between the ALTS converter 355 and the set top terminal 370 employ a protocol suitable for communication over the legacy access network 325. For instance, in an access network that employs QAM, the control channel may employ the RTSP protocol or any other suitable standard or proprietary protocol. For instance, in one particular embodiment the control channel between the SDV system 340 and the ALTS converter 355 may use the R6/D6 (RTSP) and/or RPC protocols while the control channel between the set top terminal 370 and the SDV system 340 may employ DSMCC control messages.

In operation, SDV system 340 can be used to select an ABR profile for a service that is destined for a QAM set top terminal based on the currently available bandwidth. Moreover, the ABR profile may be changed upward (i.e., a profile requiring a greater bandwidth) or downward (i.e., a profile requiring less bandwidth) on a dynamic basis as the number of requested services changes.

As an example, assume that the following ABR profiles exist for a particular multimedia content item:

- 18 Mbps High Efficiency Video Coding (HEVC) Ultra-High Definition (UHD)
- 15 Mbps MPEG-2 High Definition (HD)
- 7 Mbps Advanced Video Coding (AVC) HD
- 5 Mbps AVC HD
- 3.5 Mbps AVC HD
- 3.5 Mbps MPEG-2 Standard Definition (SD)
- 1.8 Mbps AVC SD (16:9 aspect ratio)
- 1.2 Mbps AVC reduced SD (16:9 aspect ratio)

These profiles are illustrative only and in practice may not all be available in any particular case. Likewise, in some cases additional profiles not illustrated may be available.

For simplicity, assume in this example that there is 1 QAM allocated for SDV management. Further assume that this single QAM could support 10 services at 3.5 Mbps or two at 15 Mbps and two at 3.5 Mbps. Further, assume 10 services have been allocated at 3.5 Mbps each and that there is a new request for an $11^{th}$ service. When the SDV system 340 receives this request, it can instruct the ALTS converter 355 to downshift one of the current 3.5 Mbps services to 1.8 Mbps and add the new service at 1.8 Mbps, increasing the service capacity on the single QAM. The SDV system would update its bandwidth allocations based on the profile shift, and the viewer(s) receiving the QAM service on their set top terminal might see a small shift in video quality, but there would be no service interruption arising from the change in ABR profile. Similarly, as the number of services requested on this SDV-managed QAM decreases, the SDV system can instruct the ALTS converter 355 to shift some of the remaining services to higher bandwidths (quality), possibly including UHD when there are only one or two services being requested and the requesting set tops terminals are HEVC 4$k$ capable and enabled.

Figure 4:
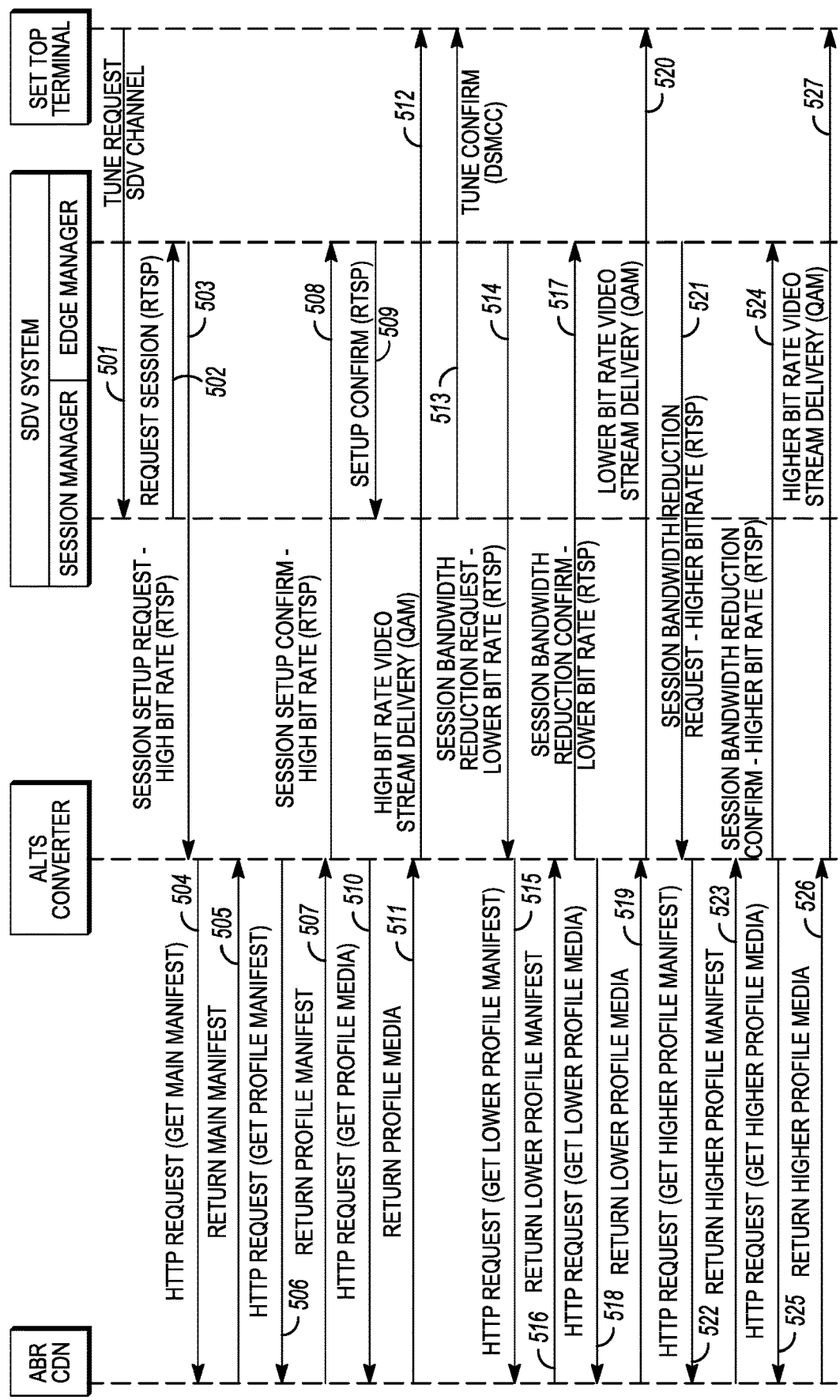
FIG. 4 is a message flow diagram illustrating one example of a method in which an SDV system begins delivery of an SDV session to a set top terminal at one bit rate and then changes it to another bit rate while delivery to the set top terminal is in progress.

FIG. 4 is a message flow diagram illustrating one example of a method in which the SDV system 340 in FIG. 3 begins delivery of an SDV session to set top terminal 370 at a given bit rate, then shifts down the bit rate of the content being delivered and then shifts the bit rate back up at a later time. For purposes of illustration, in this example the control messages communicated between the ABR CDN 310 and the ALTS converter 355 employs the hypertext transfer protocol ("HTTP") and the control messages communicated between set top box 370 and the ALTS converter 355 and between SDV system 340 and the ALTS converter 355 and the set top 370 employ the real time streaming protocol (RTSP). Of course, other suitable protocols may be employed depending on the system architecture.

First, at 501, the set top terminal 370 sends a tune request requesting an SDV channel to the session manager 345. The SDV session manager 345 responds at 502 by sending a session request to the SDV edge manager 340, which in turns sends a session set up request to the ALTS converter 355 at 503 requesting delivery at a first bit rate, which may be, by way of example the highest bit rate that is available for the content being requested. Next, at 504, the ALTS converter 355 sends an HTTP request to the CDN 310 requesting the main manifest and at 505 the CDN 310 returns the main manifest to the ALTS converter 355. The ALTS converter 355 selects one of the available profiles (e.g., the profile with the highest bit rate) from the manifest and requests that profile manifest at 506. At 507 the CDN 310 sends the profile manifest for the selected profile to the ALTS converter 355. The ALTS converter 355 then sends a session setup confirm message to the edge manager 350 at 508 and the edge manager 350 sends a setup confirmation message at 509. The ALTS converter 355 also sends an HTTP request at 510 to the CDN 310 requesting delivery of the media content specified in the selected profile manifest. At 511 the CDN 310 begins delivery of the media content with the selected profile to the ALTS converter 355. The ALTS converter 355 receives the ABR stream for the media content, converts it to e.g., an MPEG transport stream, modulates it (or sends it to a separate modulator for modulating it) for delivery over the access network 325 and at 512 delivers the modulated transport stream over the access network for delivery to the set top terminal 370. Finally, at 513 the session manager 345 sends a tune confirm message to the set top terminal 370.

At some later time the edge manager 350 determines that it needs to lower the bit rate of the media content being delivered to the set top terminal 370. Accordingly, at 514 the edge manager 350 sends a session bandwidth reduction request to the ALTS converter 355, which in turns requests one of the lower bit rate profile manifests from the CDN 310 at 515. The CDN 310 provides the lower bit rate profile manifest to the ALTS converter 355 at 516 and the ALTS converter 355 confirms the bandwidth reduction to the edge manager 350 at 517. At 518 the ALTS converter 355 sends an HTTP request to the CDN 310 requesting delivery of the media content at the lower bit rate. At 519 the CDN 310 begins delivery of the media content at the lower bit rate to the ALTS converter 355. The ALTS converter 355 receives the ABR stream for the media content, converts it to e.g., an MPEG transport stream, modulates it (or sends it to a separate modulator for modulating it) for delivery over the access network 325 and at 520 delivers the modulated transport stream over the access network for delivery to the set top terminal 370.

At a still later time the edge manager 350 determines that it is able to increase the bit rate of the media content being delivered to the set top terminal 370. Accordingly, at 521 the edge manager 350 sends a session bandwidth increase request to the ALTS converter 355, which in turns requests one of the higher bit rate profile manifests from the CDN 310 at 522. The CDN 310 provides the higher bit rate profile manifest to the ALTS converter 355 at 523 and the ALTS converter 355 confirms the bandwidth reduction to the edge manager 350 at 524. At 525 the ALTS converter 355 sends an HTTP request to the CDN 310 requesting delivery of the media content at the higher bit rate. At 526 the CDN 310 begins delivery of the media content at the higher bit rate to the ALTS converter 355. The ALTS converter 355 receives the ABR stream for the media content, converts it to e.g., an MPEG transport stream, modulates it (or sends it to a separate modulator for modulating it) for delivery over the access network 325 and at 527 delivers the modulated transport stream over the access network for delivery to the set top terminal 370.

The ABR profile that is selected for delivery to the set top terminal may in part depend on the codecs that are available to the set top terminal. For instance, set top terminals that support newer codecs such as AVC or HEVC may be offered higher quality profiles at a given bitrate that these codecs support.

In some embodiments the ABR stream that is delivered by the ABR system to the ALTS converter may be a smart adaptive bit rate (SABR) stream, which varies the bit rate of the stream based on the complexity of the content at any given time, but in this scenario, stays within the maximum bandwidth allocated for the stream by the SDV edge manager 350. In this way services can be delivered at either constant quality across all the services or alternatively, the currently most popular services may be delivered at higher quality while less popular services are delivered at lower quality.

In yet other embodiments selected ones of the higher quality profiles of the same content may be offered at higher cost. This may be accomplished by providing suitable signaling paths between the SDV system and the billing/entitlement systems that are employed.

In another embodiment, the techniques described herein may be use not only for live content and on demand content, but also for pre-scheduled events. For instance, a high bandwidth, high resolution channel on the legacy access network may be reserved in advance for events such as the SuperBowl.

Figure 5:
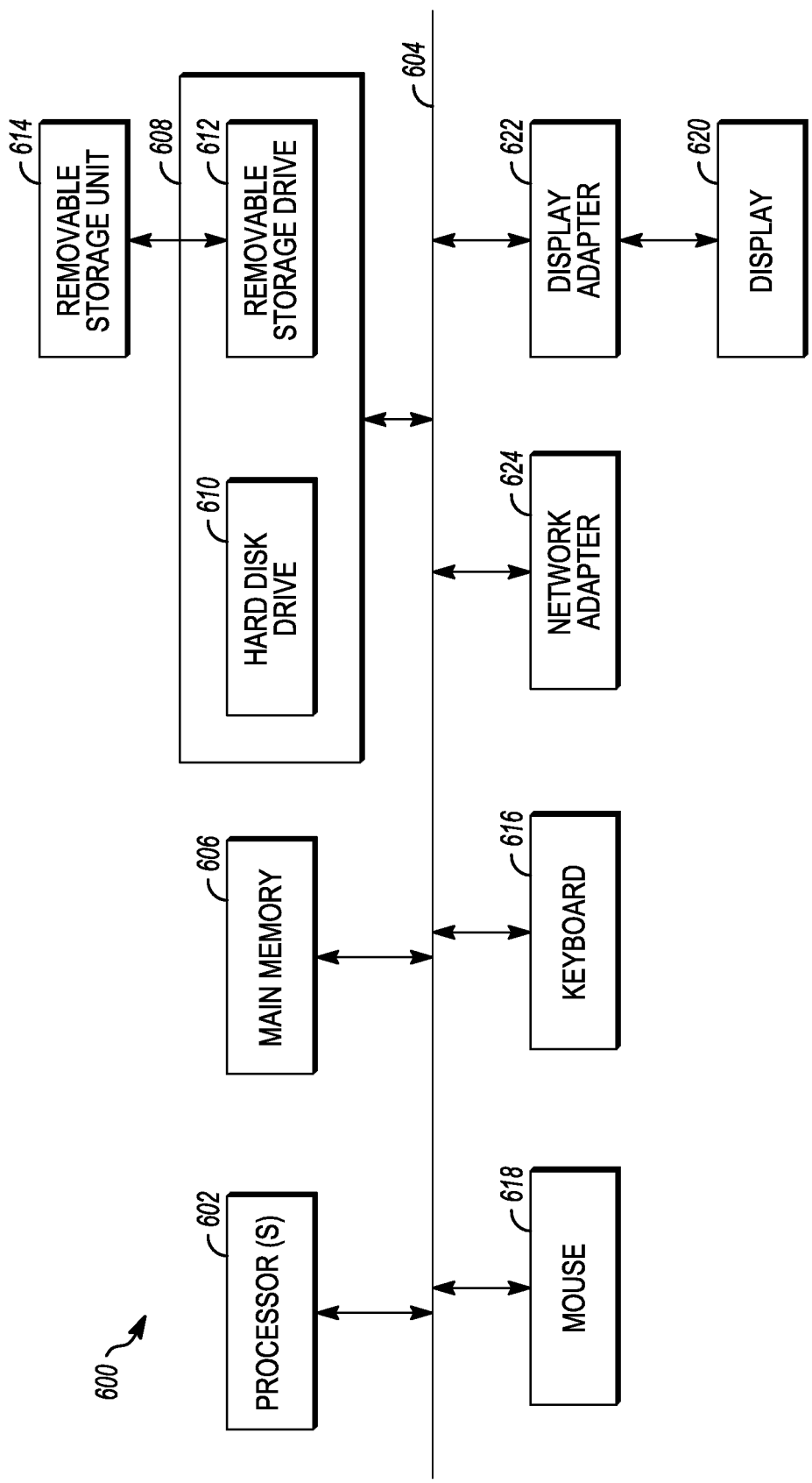
FIG. 5 illustrates a block diagram of one example of a computing apparatus that may be configured to implement or execute one or more of the processes performed by any of the various devices shown herein

FIG. 5 illustrates a block diagram of one example of a computing apparatus 600 that may be configured to implement or execute one or more of the processes performed by any of the various devices shown herein, including but not limited to the ALTS converter 355, the SDV session manager 345 and the edge manager 350. It should be understood that the illustration of the computing apparatus 600 is a generalized illustration and that the computing apparatus 600 may include additional components and that some of the components described may be removed and/or modified without departing from a scope of the computing apparatus 600.

The computing apparatus 600 includes a processor 602 that may implement or execute some or all of the steps described in the methods described herein. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 410 and/or a removable storage drive 612, where a copy of the program code for one or more of the processes depicted in FIGS. 2-5 may be stored. The removable storage drive 612 reads from and/or writes to a removable storage unit 614 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method for transmitting media content over an access network, comprising:
   (i) receiving a session setup request over an access network that employs a specified modulation technique from an on-demand manager for receiving on-demand media content at a specified bit rate;
   (ii) selecting a profile from an adaptive bit rate (ABR) main manifest for ABR media content corresponding to the on-demand content;
   (iii) requesting and receiving an ABR profile manifest from an ABR system for the selected profile of the ABR media content;
   (iv) requesting the ABR media content in the profile manifest from the ABR system;
   (v) receiving an ABR stream for the ABR media content;
   (vi) transforming the ABR stream into a prescribed transport stream;
   (vii) causing the prescribed transport stream to be modulated in accordance with the prescribed modulation technique; and
   (viii) causing the modulated prescribed transport stream to be transmitted to a client terminal over the access network.

2. The method of claim 1 further comprising
   (ix) receiving a request from the on-demand manager for changing the specified bit rate of the on-demand media content being delivered to the client terminal to a different bit rate; and
   (x) repeating (ii)-(viii) for a profile in ABR main manifest for the ABR media content corresponding to the different bit rate.

3. The method of claim 1, wherein the prescribed modulation technique is quadrature amplitude modulation (QAM).

4. The method of claim 1, wherein the prescribed transport stream is an MPEG transport stream.

5. The method of claim 1, wherein the access network is an Hybrid Fiber-Coax (HFC) network.

6. The method of claim 1, wherein the on-demand manager is a switched digital video (SDV) edge manager for managing delivery of the on-demand content on an SDV channel.

7. The method of claim 1, wherein selecting the profile from an ABR main manifest further comprises selecting the profile based in part on a request from the client terminal for receipt of an upgraded profile at additional cost.

8. The method of claim 1, wherein the ABR media content is broadcast content.

9. The method of claim 1, wherein the ABR media content is on-demand content.

10. A method for allocating bandwidth on an access network, comprising:
    monitoring bandwidth on an access network that employs a prescribed modulation technique;
    assigning bandwidth on the access network to an SDV channel for delivery to a client terminal over the access network based at least in part on the monitored bandwidth;
    causing a first version of an ABR content stream for media content corresponding to content requested on the SDV channel to be transformed into a prescribed transport stream for delivery to the client device over the access network, the first version of the ABR content stream having a bit rate corresponding to the assigned bandwidth and being selected from among a plurality of versions available in an ABR main manifest;
    adjusting the bandwidth assigned to the SDV channel while the SDV channel is being delivered to the client terminal; and
    responsive to the adjusting, causing a second version of the ABR content stream to be transformed into a transport stream for delivery to the client terminal over the access network instead of the first version, the second version of the ABR content stream having a bit rate corresponding to the adjusted assigned bandwidth and being selected from among the plurality of versions available in the ABR main manifest.

11. The method of claim 10, wherein adjusting the bandwidth assigned to the SDV channel includes adjusting the bandwidth based at least in part on a network operator-determined tradeoff between a quality level of the SDV channel being delivered and currently available network resources.

12. The method of claim 10, wherein the content requested on the SDV channel is broadcast content.

13. The method of claim 10, wherein the content requested on the SDV channel is on-demand content.

14. The method of claim 10, wherein the monitoring and assigning are performed by an SDV edge manager.

15. The method of claim 10, wherein the prescribed modulation technique employed by access network is quadrature amplitude modulation.

16. One or more non-transitory computer-readable storage media containing instructions which, when executed by one or more processors perform a method for managing transmission of ABR media content over an access network that employs a prescribed modulation technique, the method comprising:
(i) receiving a tune setup request over an access network from a client terminal for receiving media content on an SDV channel;
determining a first bit rate at which the media content is to be delivered over the access network based at least in part on bandwidth that is available on the access network;
requesting a session setup request for the media content from an ABR to Legacy Transport Stream (ALTS) converter that converts ABR media content into a format suitable for transmission over the access network to thereby cause a first version of an ABR media stream corresponding to the requested media content at the first bit rate to be delivered to the client terminal over the access network in the format suitable for transmission over the access network, the first version of the ABR media steam being selected from an ABR main manifest;
determining that the first bit rate at which the media content is to continue being delivered over the access network is to change to a second bit rate; and
sending a session bandwidth change request to the ALTS converter to thereby cause a second version of the ABR media stream corresponding to the requested media content at the second bit rate to be delivered to the client terminal over the access network in the format suitable for transmission over the access network.

17. The computer-readable storage media of claim 16, further comprising monitoring bandwidth on the access network and wherein determining that the first bit rate is to change to the second bit rate is based at least in part on a change in availability of the bandwidth being monitored.

18. The computer-readable storage media of claim 16, further comprising monitoring the bandwidth with an SDV edge manager.

19. The computer-readable storage media of claim 16, wherein determining that the first bit rate is to change to the second bit rate includes determining that the first bit rate is to change to the second bit rate based at least in part on a network operator-determined tradeoff between a quality level of the SDV channel being delivered and currently available network resources.

20. The computer-readable storage media of claim 16, wherein the prescribed modulation technique employed by the access network is quadrature amplitude modulation.

* * * * *